(12) United States Patent
Wang

(10) Patent No.: US 7,695,797 B2
(45) Date of Patent: Apr. 13, 2010

(54) CORROSION RESISTANT HONEYCOMB

(75) Inventor: Yen-Seine Wang, San Ramon, CA (US)

(73) Assignee: Hexcel Corporation, Dublin, CA (US)

( * ) Notice: Subject to any disclaimer, the term of this patent is extended or adjusted under 35 U.S.C. 154(b) by 607 days.

(21) Appl. No.: 11/476,964

(22) Filed: Jun. 27, 2006

(65) Prior Publication Data

US 2007/0298212 A1  Dec. 27, 2007

(51) Int. Cl.
*B32B 3/12* (2006.01)
*B32B 27/38* (2006.01)
*B32B 27/42* (2006.01)
*B32B 27/34* (2006.01)
*B32B 1/00* (2006.01)

(52) U.S. Cl. .................. 428/116; 428/192; 428/119; 428/327; 264/629; 52/309.1

(58) Field of Classification Search .......... 428/116, 428/58, 118, 119, 192, 188; 156/197, 290, 156/292, 89.11; 52/302.1
See application file for complete search history.

(56) References Cited

U.S. PATENT DOCUMENTS

| | | | |
|---|---|---|---|
| 3,687,882 A | 8/1972 | Bishop | |
| 4,316,974 A | 2/1982 | Ohmura et al. | |
| 4,355,199 A * | 10/1982 | Luc | 174/261 |
| 4,675,350 A * | 6/1987 | Marchetti et al. | 523/414 |
| 4,710,432 A * | 12/1987 | Nishimura et al. | 428/542.8 |
| 5,087,658 A | 2/1992 | Nishizawa et al. | |
| 5,520,750 A * | 5/1996 | Riley | 148/261 |
| 5,650,226 A * | 7/1997 | Lescaut | 428/338 |
| 6,117,518 A * | 9/2000 | Cawse et al. | 428/116 |
| 6,245,407 B1 * | 6/2001 | Wang et al. | 428/116 |
| 6,281,275 B1 | 8/2001 | Sanduja et al. | |
| 6,440,257 B1 | 8/2002 | Zhou et al. | |
| 6,482,529 B2 | 11/2002 | Sanduja et al. | |
| 6,508,910 B2 | 1/2003 | Zhou et al. | |
| 2003/0143418 A1 | 7/2003 | Wang | |
| 2004/0031235 A1 * | 2/2004 | Karmarkar et al. | 52/793.1 |
| 2006/0046019 A1 | 3/2006 | Wang et al. | |

FOREIGN PATENT DOCUMENTS

| | | | |
|---|---|---|---|
| EP | 0820858 A | 1/1998 |
| EP | 1048446 A | 11/2000 |
| GB | 1532112 A | 11/1978 |

* cited by examiner

*Primary Examiner*—D. Lawrence Tarazano
*Assistant Examiner*—Nicole T Gugliotta
(74) *Attorney, Agent, or Firm*—W. Mark Bielawski; David J. Oldenkamp

(57) ABSTRACT

Corrosion resistant metallic honeycomb composed of a plurality of honeycomb cells having cell walls that include cell edges that form the edge of the honeycomb. A corrosion resistant coating that contains polyamideimide is used to cover the cell walls and cell edges. The corrosion resistant coating is preferably applied after the honeycomb structure has been formed.

18 Claims, 2 Drawing Sheets

CORROSION RESISTANT HONEYCOMB

BACKGROUND OF THE INVENTION

1. Field of the Invention

The present invention relates generally to metallic honeycombs and the ways in which such honeycombs are protected against corrosion. More particularly, the present invention is directed to improving the corrosion resistance of metallic honeycomb that is intended for use in corrosive environments.

2. Description of Related Art

Honeycomb structures are well known and widely used in many applications where a high strength and low weight material is required. The combined features of low weight and strength found in honeycomb structures makes them particularly well suited for use in aircraft and other applications where high strength and low weight are particularly desirable. Honeycomb structures have been made from a wide variety of materials including metals, such as aluminum and aluminum alloys. Such structures are referred to as aluminum honeycomb or aluminum core. When the term "aluminum" is used by itself herein, it is understood to cover both aluminum and aluminum alloys. Composite materials made from resin-impregnated fibers and papers have also been widely used in honeycomb structures.

One common process for fabricating honeycomb structures involves bonding multiple thin sheets of aluminum together along specially oriented node lines. The node lines are offset between the different layers in such a way that a honeycomb structure is formed when the layers are expanded. This type of process is commonly referred to as the "expansion" process. The expansion process is not suitable for fabricating honeycomb structures in some instances where certain types of aluminum are used. For example, sheets that are relatively thick or are made from certain alloys of aluminum are too stiff and cannot be formed into honeycomb structures using the expansion process.

A fabrication process or method commonly referred to as the "corrugation" process has been used to form high strength honeycomb structures in those situations where the expansion process is not suitable. The corrugation process involves initially shaping sheets of aluminum into a corrugated configuration. The corrugated aluminum sheets are then bonded together along node lines to form the final honeycomb.

In both the expansion and corrugation processes, adhesives are typically used to bond the aluminum sheets together. Such adhesives are commonly referred to as "node adhesives". The surfaces of the aluminum sheets are usually coated with a polymer-based coating or otherwise treated to insure good adhesion between the node adhesive and the sheet. The strength of the bond between the adhesive and the treated aluminum sheets is generally determined by measuring the peel strength of the adhesive. Peel strength is typically measured using a standard procedure as set forth in ASTMD 1781. The test basically involves gluing two 3-inch (7.6 cm) or two 1-inch (2.54 cm) wide strips of metal sheets together and the measuring of the amount of force required to peel the two strips apart.

Achieving maximum peel strength for a given adhesive is an important goal when manufacturing high strength honeycomb. Failure of the adhesive bond between aluminum sheets can result in complete failure of the entire structure. Accordingly, there is a need to provide surface coatings and/or treatments for aluminum that enhance adhesion of the node adhesive to the metal surface.

Aluminum honeycomb is a popular core material for use in the construction of sandwich panels where the honeycomb is "sandwiched" between two sheets of material that are commonly referred to as "skins". An adhesive is typically used to bond the edges of the honeycomb to the skins. In some cases, the skins are self-adhesive and do not require the use of an adhesive layer. The strength of the adhesive bond between the edge of the honeycomb and the skins is also an important consideration in treating or otherwise coating the aluminum core. Failure of the edge adhesive also can result in failure of the structure.

Aluminum is also usually treated to increase resistance to corrosion. Chromate has been a popular corrosion resistant coating for aluminum that has been widely used. However, there are a number of environmental concerns associated with the use of chromate. A number of other corrosion resistant coatings have been developed for aluminum. For example, U.S. Pat. No. 3,687,882 describes coating aluminum with silane-titanante dispersions. Anodizing the aluminum with phosphoric acid and/or coating the aluminum with epoxy or modified phenolic have also been popular methods for making the honeycomb corrosion resistant.

In the art of preparing aluminum honeycomb, there has been and continues to be a need for surface treatments that not only provide good peel strengths at the nodes and edges, but also provide good corrosion protection, especially when the honeycomb is intended for use in known corrosive environments. Developing a coating system or treatment that provides all of the above features is an important goal in making honeycomb from aluminum that is suitable for use where high strength and light weight is required.

SUMMARY OF THE INVENTION

In accordance with the present invention, corrosion resistant metallic honeycomb is provided wherein the honeycomb edges and/or walls are coated with a corrosion resistant coating that contains polyamideimide. In addition, the present invention covers methods for applying the corrosion resistant coating to the surfaces of the metallic material both before and/or after formation of the metallic material into the honeycomb.

In accordance with the present invention, it was discovered that the corrosion resistance of metallic honeycomb is increased by covering the edges and/or walls of the honeycomb with a corrosion resistant coating that contains polyamideimide. It was further discovered that the corrosion resistant coating is preferably applied to the honeycomb after the honeycomb has been formed in order to fill micro-cracks that are formed during processing of the sheets of metallic material into the final honeycomb structure.

The present invention involves providing corrosion resistance to a metallic honeycomb that has a plurality of honeycomb cells that include cell walls that have edges. The edges of the cell walls form the edges of the honeycomb. As a feature of the present invention, a corrosion resistant coating that contains polyamideimide is used to cover at least the cell walls and preferably both the cells walls and edges. The corrosion resistant coating is useful in treating metallic materials, such as aluminum and aluminum alloys, which have been previously anodized and/or coated with a polymer to increase corrosion resistance. The corrosion resistant coating of the present invention is especially effective in sealing micro-cracks that may develop in such previously applied corrosion resistant coatings during formation of the honeycomb.

In accordance with the present invention, the corrosion resistant coating can be applied to the honeycomb as a final corrosion proofing coating during sandwich panel construction without adversely affecting the bond between the edges of the honeycomb and the face sheets. Accordingly, the coating provides the dual benefits of increased corrosion resistance and good skin-core bonding characteristics.

The above described and many other features and attendant advantages of the present invention will become better understood by reference to the following detailed description when taken in conjunction with the accompanying drawings.

DETAILED DESCRIPTION OF THE INVENTION

The present invention involves increasing the corrosion resistance of metallic honeycomb by coating the exposed surfaces of the honeycomb with polyamideimide. The invention may be used to treat honeycomb that is made from any of the metallic materials that are used to make honeycomb, such as aluminum and aluminum alloys. Exemplary aluminum alloys include 5052 and 5056 alloys, which are commonly used in honeycomb structures. Preferred honeycombs are those made from aluminum or aluminum alloys. The metallic materials used to make honeycomb are typically in the form of sheets or foil that ranges in thickness from 0.0005 inch up to 0.05 inch, but may be thicker or thinner, if desired. The honeycomb can be of virtually any size or shape and can be made by any of the known honeycomb manufacturing methods, including the expansion and corrugation methods.

The honeycomb may be used for any number of purposes. However, the honeycomb is preferably used for making sandwich panels that find a wide variety of applications in the aerospace industry. The sandwich panels are used as both structural and non-structural components of aerospace vehicles. The honeycomb is especially well suited for making sandwich panels that are used in aircraft. Exemplary sandwich panels or structures are used in engine nacelles, wing and tail structures and fuselage components, such as floorboards and other interior partitions. The corrosion resistance provided by the present invention is particularly desirable in such aircraft components because they are typically subjected to a wide variety of environments that are potentially corrosive.

Figure 1:
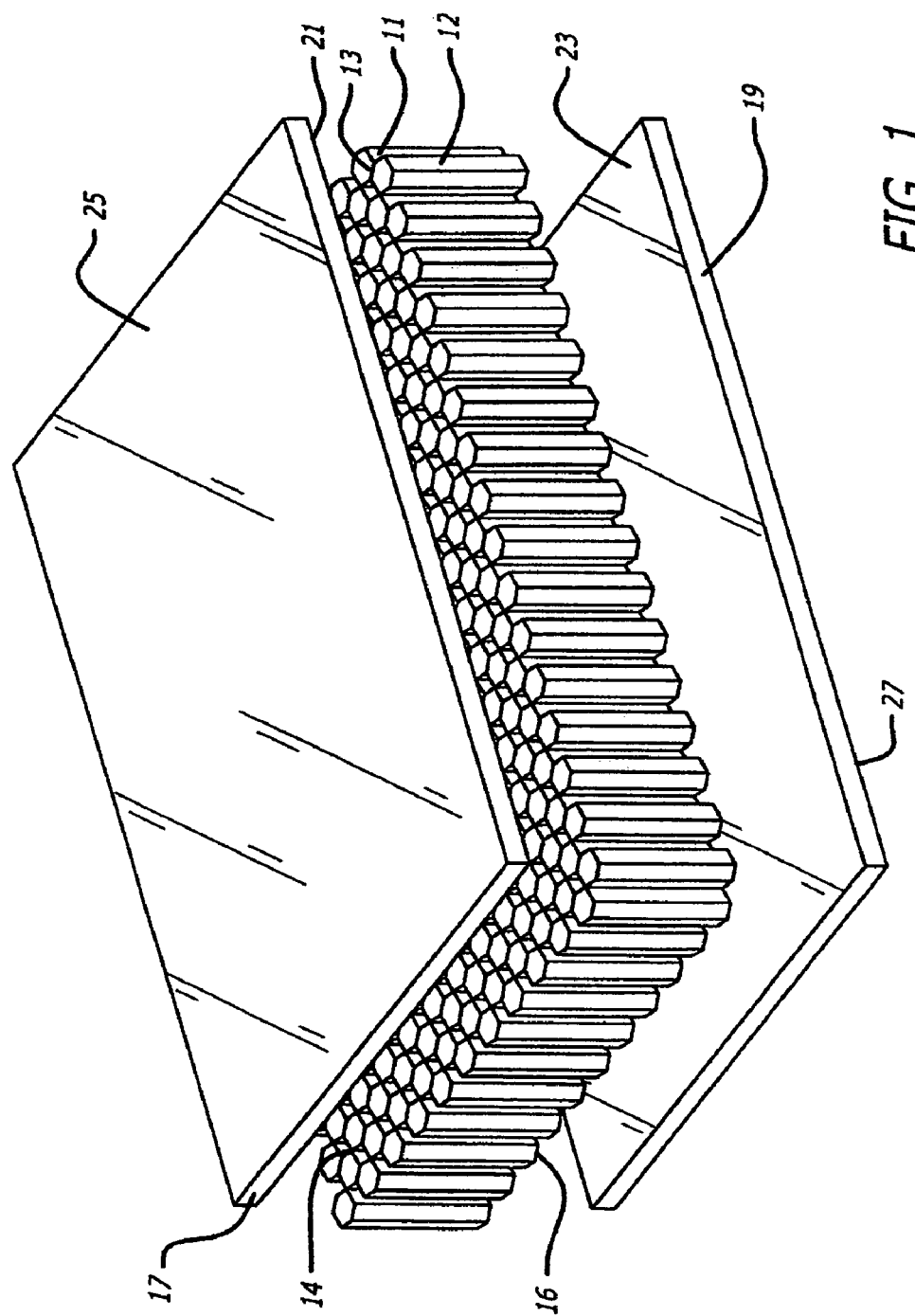
FIG. 1 shows an exemplary corrosion resistant metallic honeycomb in accordance with the present invention prior to application of face sheets or skins to the edges of the honeycomb to form a sandwich panel.

The three basic components of an exemplary honeycomb sandwich panel for use in aerospace applications are shown in FIG. 1 prior to formation of the panel. The components include a honeycomb core 12 that has walls 11 which form a plurality of honeycomb cells 13. The walls have edges that form the faces or edges of the honeycomb as shown at 14 and 16. The other two components are the face sheets or skins 17 and 19. The face sheets 17 and 19 include interior surfaces 21 and 23, respectively, for bonding to the honeycomb edges. The face sheets 17 and 19 also include exterior surfaces 25 and 27, respectively. The face sheets 17 and 19 can be made from a wide variety of metallic and/or composite materials that are bonded to the edges of the honeycomb 14 and 16.

The dimensions of the honeycomb can be varied widely. For aerospace use, the honeycomb cores will typically have ⅛ to ½ inch (3.2 to 12.7 mm) cells (i.e. in diameter cross-section) with the cores being ¼ inch (6.4 mm) to 2 inches (50.8 mm) thick (distance between the honeycomb edges). The thickness of the honeycomb walls may also be varied with typical honeycomb walls being on the order of 0.001 inch (0.25 mm) to 0.005 inch (0.13 mm) thick. The combination of cell size, wall thickness and density of the material that is used determines the weight of the core, which is expressed in pounds per cubic foot (pcf). Aluminum and aluminum alloy honeycomb having weights on the order of 2 pcf to 8 pcf are preferred.

Figure 2:
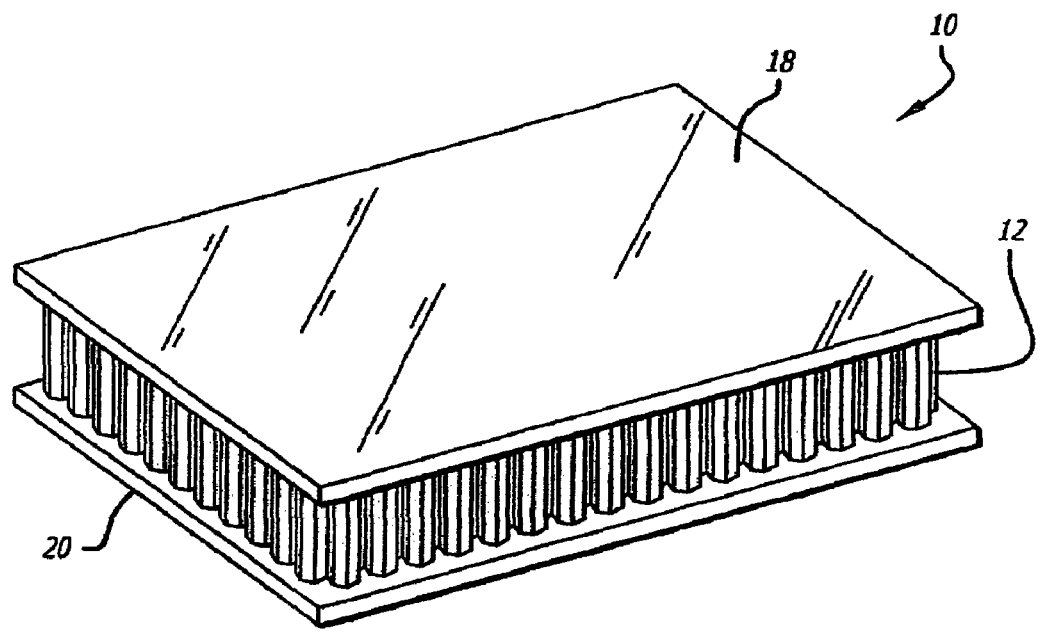
FIG. 2 shows the exemplary corrosion resistant metallic honeycomb after it has been bonded to face sheets to form a sandwich panel.

The face sheets 17 and 19 that are bonded to the honeycomb 12 can be made from any of the materials that are used in the construction of sandwich panels having metallic honeycomb cores. Such materials include both metals and composite material. When metals or pre-cured composite face sheets are bonded to the honeycomb, an adhesive is used. Alternatively, uncured sheets of composite materials known as a "prepreg" may be located on the edges of the honeycomb and bonded/cured in place. Such prepregs may be self-adhesive or an additional adhesive may be used. In FIG. 1, the face sheets 17 and 19 are preferably self-adhesive prepreg that is cured in place to form the final sandwich panel 10 (as shown in FIG. 2), which includes cured face sheets 18 and 20.

The prepreg face sheets usually include one or more layers of fibers and a resin matrix. The fibers that are used in the prepreg face sheets 17 and 19 can be any of the fiber materials that are used to form composite laminates. Exemplary fiber materials include glass, aramid, carbon, ceramic and hybrids thereof. The fibers may be woven, unidirectional or in the form of random fiber mat. Woven carbon fibers are preferred, such as plain, harness satin, twill and basket weave styles that have areal weights from 80-600 gsm, but more preferably from 190-300 gsm. The carbon fibers can have from 3,000-40,000 filaments per tow, but more preferably 3,000-12,000 filaments per tow. Similar styles of glass fabric may also be used with the most common being 7781 at 303 gsm and 120 at 107 gsm. When unidirectional constructions are used, typical ply-weights are 150 gsm for carbon and 250 gsm for glass. All of these carbon and glass fibers and fabric are commercially available.

The resin used in the prepreg face sheets may be any of the thermosetting polymers that are typically used for prepreg face sheets. Typical polymer resins include epoxies, cyanate esters and bismaleimides. The thermosetting resins may include thermoplastic polymers to provide viscosity control and enhance fillet formation and toughness, as is known in the art. Exemplary self adhesive face sheets are described in detail in U.S. Pat. Nos. 6,440,257 and 6,508,910, the contents of which is specifically incorporated by reference.

The corrosion resistant coating in accordance with the present invention may be applied to the surfaces of the metallic material either before or after it has been formed into the final honeycomb. However, it is preferred that the coating be applied to the metallic material after it has been formed into the final honeycomb. It was discovered that the corrosion resistant coating was effective in covering micro-cracks, which may develop in the surface of the metallic material and/or pre-applied corrosion coatings during the honeycomb formation process.

Figure 3:
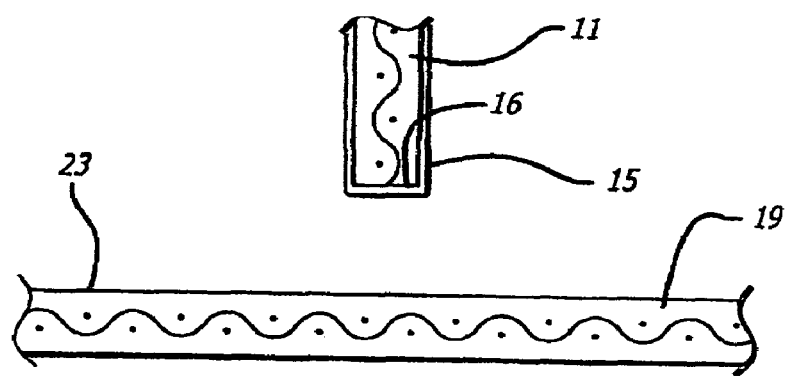
FIG. 3 is a partial sectional view of the exemplary honeycomb shown in FIG. 1, which shows an edge of the honeycomb in position for bonding to one of the face sheets.

The coating may be applied by any of the known coating application systems. The preferred application technique is to dip the honeycomb into a solution of polyamideimide to completely coat all exposed surfaces of the honeycomb. The honeycomb may be completely immersed in the polyamide-imide solution to provide the coating or it may be partially immersed multiple times in different orientations so as to provide complete surface coverage. As shown in FIG. 3, both the honeycomb walls 11 and honeycomb edges 16 are preferably covered with a coating of polyamideimide 15 in accordance with the present invention. Other exemplary application systems include spraying and overdipping.

The metallic material is preferably, but not necessarily, subjected to one or more conventional corrosion prevention treatments prior to formation of the honeycomb. Any of the known corrosion resistant surface pre-treatments and/or coatings (primers) may be used prior to application of the corrosion resistant coating in accordance with the present invention. It is only necessary that the surface treatment and/or primer be compatible with polyamideimide. Aluminum and aluminum alloy materials are preferably anodized with phosphoric acid and then coated with a corrosion resistant primer. Exemplary primers include those made from epoxy or modified phenolic resins. Exemplary primers are available commercially available from Cytec Corporation (Anaheim, Calif.) under the tradename BR 127. Conversion type coating such as Alodine® may also be used.

Aluminum honeycomb that is suitable for treatment in accordance with the present invention is commercially available from Hexcel Corporation (Dublin, Calif.) under the tradenames HexWeb®CR-PAA, HexWeb®CRIII and HexWeb®ACG®. HexWeb®CR-PAA is an aluminum honeycomb that has been anodized with phosphoric acid and coated with a modified phenolic primer. HexWeb®CRIII is an aluminum honeycomb that has been conversion coated with chromate and then seal coated with titanate and amino silane. HexWeb®ACG® is an aluminum honeycomb that has been conversion coated with chromate and then seal coated with titanate and amino silane.

The corrosion resistant coating 15 in accordance with the present invention is composed substantially of polyamideimide. Minor amount of other ingredients are possible. However, it is preferred that at least 95 weight percent of the coating be polyamideimide. Even more preferably, the coating should be at least 99 weight percent polyamideimide. The coating 15 should be from 0.0002 inch to 0.0004 inch thick on the cell wall. It is preferred that the coating 15 be as thin as possible to keep the weight of the honeycomb as low as possible, while at the same time providing complete coverage of the exposed surfaces of the honeycomb. The exposed surfaces are those that are not located in the nodes where the various metallic layers are bonded together to form the honeycomb.

The polyamideimide coating 15 is formed by applying a solution of reactive (amic acid) prepolymer to the honeycomb and then heating the honeycomb to achieve drying (i.e. removal of the solvent) and curing. The reactive amic acid polymer solution will typically contain aromatic amide, aromatic amic acid and aromatic imide moieties. These moieties are readily soluble in NMP. A preferred exemplary reactive amic acid polymer is TORLON® AI-10, which is available from Solvay Advanced Polymers (Alpharetta, Ga.). TORLON® AI-10 is supplied as a yellow powder in the un-imidized or amic acid form. TORLON® AI-10 has an acid number (mg KOH/g of polymer) of 80 and is soluble in diprotic solvents. Other suitable (amide-imide) prepolymers solutions are set forth in U.S. Pat. Nos. 4,316,974 and 5,087,658.

The (amide-imide) prepolymer is soluble in a wide variety of organic solvents including: 1-methyl 2-pyrrolidone (NMP); formamide; dimethyl sulfoxide; dimethyl acetamide The amic acid polymer is dissolved in the solvent to provide a solution that has the appropriate viscosity for applying the desired coating thickness depending upon the application technique. When using the preferred technique of dipping the honeycomb in the solution, the solution will typically contain from 5 to 30 weight percent amic acid polymer in the solvent. Preferred dipping solutions, in which the honeycomb is immersed, contain from 5 to 17 weight percent TORLON® AI-10 powder in NMP solvent.

After the honeycomb is dipped in the solution of amic acid polymer, it can be dried at temperatures up to about 200° C. in order to remove solvent and form an uncured coating that is subsequently heated to a temperature of between 200 to 225° C. in order to provide polymerization (curing). Alternatively, the coating of polymer solution may be immediately heated to the curing temperature to provide both drying and curing of the polymer solution. In either case, the honeycomb with the cured polyamideimide coating is then ready for bonding to the face sheets 17 and 19 without further treatment other than the application of an adhesive to the edges of the honeycomb, if required, for bonding to the face sheets.

Examples of practice are as follows:

EXAMPLE 1

Two aluminum alloy honeycombs (4 inches wide, 4 inches long and 0.63 inch thick) were coated with a corrosion resistant coating in accordance with the present invention as follows: the honeycombs were HexWeb® CR-PAA™ honeycombs that are available from Hexcel Corporation (Dublin, Calif.). The honeycombs were made from 5052 or 5056 aluminum alloy. The nominal cell sizes were $\frac{3}{16}$ inch, the foil thickness was 0.0015 inch and the nominal density was 4.4 pounds per cubic foot (pcf). As previously mentioned, the aluminum foil used in HexWeb® CR-PAA™ honeycomb is phosphoric acid etched and coated with a modified phenolic primer prior to honeycomb formation in accordance with the manufacturers established production process.

The HexWeb® CR-PAA™ honeycombs were immersed in a solution that contained 8.5 weight percent of TORLON® AI-10 polymer dissolved in 91.5 weight percent of NMP solvent. The honeycombs were removed from the solution and the excess solution allowed to drip from the honeycomb for to form a "wet" honeycomb. The "wet" honeycomb was then heated to a temperature of about 200° C. for about 10 minutes to dry and cure the polymer. The resulting coatings of polyamideimide ranged from about 0.0002 to 0.0004 inch in thickness.

The two honeycombs with the polyamideimide coating were then subjected to thermal aging according to a 10-day acidified salt spray testing according to ASTM G85-98 The polyamideimide coated cores had an average of 2 holes (perimeters of about 1 mm) and 22 average size (perimeters of 1 mm to a few mm) corrosion spots. Observations were based on visual inspection of two specimens. The entire core was observed for the hole count while only the perimeter of the core was inspected for corrosion spots.

Comparative Example 1

Two HexWeb® CR-PAA™ honeycomb were subjected to the same acidified salt spray testing as the honeycombs of Example 1. The honeycomb was the same as in Example 1, except that the honeycomb was not coated with polyamideimide in accordance with the present invention. After acidified salt spray testing, the two cores were inspected in the same manner as Example 1 and found to have an average of 4 holes (perimeters of about 1 mm) per core and 80 average size corrosion spots and some additional much smaller corrosion spots (perimeters of less than 1 mm).

Comparative Example 2

Two honeycombs made from 5052 or 5056 aluminum alloy and available from Hexcel Corporation under the tradename HexWeb®CRIII were subjected to the same acidified salt spray testing as Example 1. The honeycombs were the same size and had the same cell size and foil thickness as the honeycombs in Examples 1 and 2. The honeycomb was treated with a chromate conversion coating and included an epoxy primer coating. After acidified salt spray testing, the two cores were inspected in the same manner as Example 1 and found to have no holes per core and 47 average size corrosion spots.

Comparative Example 3

The same honeycomb as used in Comparative Example 1 was overdipped with additional modified phenolic primer after formation of the two honeycombs. The overdipping of the two cores with modified phenolic primer was done in the same manner as the polyamideimide coating in Example 1 to provide an additional phenolic primer coating. After acidified salt spray testing, the two cores were inspected in the same manner as Example 1 and found to have one hole per core (perimeters of about 1 mm) and 64 small corrosion spots (perimeters of about 1 mm or less).

EXAMPLE 2

Two honeycomb cores that were the same as in Example 1 were subjected to thermal aging according to a 30 day non-acidified salt spray testing according to ASTM B117-90. After salt spray testing, the two cores were inspected in the same manner as Example 1 and found to have 5 holes per core (perimeters of about 1 mm) and 47 average size corrosion spots.

Comparative Example 4

Two honeycomb cores that were the same as in Comparative Example 1 were subjected to thermal aging according to the same 30 day non-acidified salt spray testing as Example 2. After salt spray testing, the two cores were inspected in the same manner as Example 1 and found to have 24 holes per core (perimeters of about 1 mm) and 4 average size corrosion spots. In addition, numerous areas were observed where there the primer had been removed. These areas were silver in appearance.

Comparative Example 5

Two honeycomb cores that were the same as in Comparative Example 2 were subjected to thermal aging according to the same 30 day non-acidified salt spray testing as Example 2. After salt spray testing, the two cores were inspected in the same manner as Example 1 and found to have 17 holes per core (perimeters of about 1 mm) and 6 average size corrosion spots.

Comparative Example 6

Two honeycomb cores that were the same as in Comparative Example 3 were subjected to thermal aging according to the same 30 day non-acidified salt spray testing as Example 2. After salt spray testing, the two cores were inspected in the same manner as Example 1 and found to have 30 holes per core (perimeters of about 1 mm) and 12 average size corrosion spots. In addition, numerous areas were observed where there the primer had been removed. These areas were silver in appearance. There were also a number of blotchy areas.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A metallic honeycomb structure comprising:
   a metallic honeycomb comprising a plurality of honeycomb cells having cell walls wherein said cell walls include cell edges and wherein said honeycomb includes a polymer layer located on said cell walls, said polymer layer comprising a polymer selected from the group consisting of epoxy and modified phenolic; and
   a coating covering at least a portion of said polymer layer, said coating comprising a solution of reactive amic acid prepolymer.

2. A metallic honeycomb structure according to claim 1 wherein said corrosion resistant coating covers said cell walls and said cell edges.

3. A metallic honeycomb structure according to claim 1 wherein said metallic honeycomb is aluminum or an aluminum alloy.

4. A metallic honeycomb structure according to claim 3 wherein said metallic honeycomb is phosphoric acid etched aluminum or aluminum alloy.

5. A method for providing corrosion resistance to a metallic honeycomb, said method comprising the steps of:
   providing a metallic honeycomb comprising a plurality of honeycomb cells having cell walls wherein said cell walls include cell edges and wherein said metallic honeycomb includes a polymer layer located on said cell walls, said polymer layer comprising a polymer selected from the group consisting of epoxy and modified phenolic;
   applying a solution of reactive amic acid prepolymer to said polymer layer to form a coating on at least a portion of said polymer layer; and
   curing said coating to provide a corrosion resistant coating comprising polyamideimide.

6. A method for providing corrosion resistance to a metallic honeycomb according to claim 5 wherein said solution of reactive amic acid prepolymer is applied to said cell edges.

7. A method for providing corrosion resistance to a metallic honeycomb according to claim 5 wherein said metallic honeycomb is aluminum or an aluminum alloy.

8. A method for providing corrosion resistance to a metallic honeycomb according to claim 7 wherein said metallic honeycomb is phosphoric acid etched aluminum or aluminum alloy.

9. A method for providing corrosion resistance to a metallic honeycomb according to claim 5 wherein said corrosion resistant coating consists essentially of polyamideimide.

10. A method for providing corrosion resistance to a metallic honeycomb according to claim 8 wherein said corrosion resistant coating consists essentially of polyamideimide.

11. A metallic honeycomb structure according to claim 1 wherein said solution of reactive amic acid prepolymer has been cured to form a corrosion resistant coating comprising polyamideimide.

12. A metallic honeycomb structure according to claim 11 wherein said corrosion resistant coating covers said cell walls and said cell edges.

13. A metallic honeycomb structure according to claim 11 wherein said metallic honeycomb is aluminum or an aluminum alloy.

14. A metallic honeycomb structure according to claim 13 wherein said metallic honeycomb is phosphoric acid etched aluminum or aluminum alloy.

15. A corrosion resistant metallic honeycomb structure comprising:

a metallic honeycomb comprising a plurality of honeycomb cells having cell walls wherein said cell walls include cell edges and wherein said honeycomb includes a polymer layer located on said cell walls, said polymer layer comprising a polymer selected from the group consisting of epoxy and modified phenolic; and a corrosion-resistant coating covering at least a portion of said polymer layer, said corrosion resistant coating comprising at least 95 weight percent polyamideimide.

16. A metallic honeycomb structure according to claim 15 wherein said corrosion resistant coating covers said cell walls and said cell edges.

17. A metallic honeycomb structure according to claim 15 wherein said metallic honeycomb is aluminum or an aluminum alloy.

18. A metallic honeycomb structure according to claim 17 wherein said metallic honeycomb is phosphoric acid etched aluminum or aluminum alloy.

* * * * *